Figure 1:
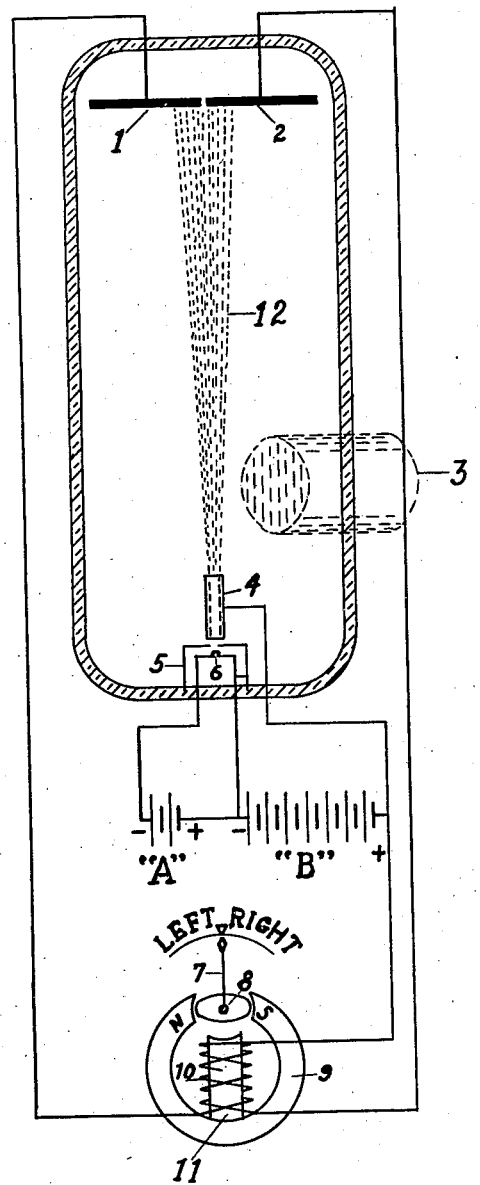

Dec. 24, 1935.  H. H. ENGELHARDT  2,025,580
COMPASS
Filed Aug. 6, 1930   2 Sheets-Sheet 1

INVENTOR.
Henry Hugo Engelhardt

Dec. 24, 1935. H. H. ENGELHARDT 2,025,580
COMPASS
Filed Aug. 6, 1930  2 Sheets-Sheet 2
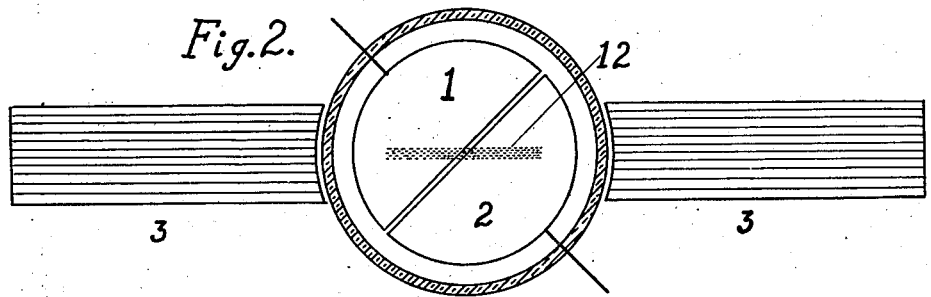
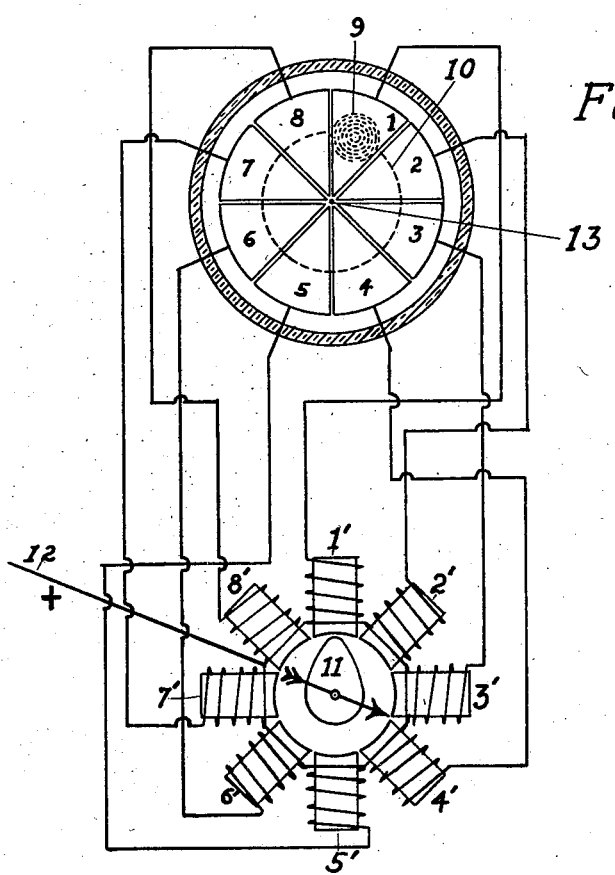
INVENTOR.
Henry Hugo Engelhardt Patented Dec. 24, 1935

2,025,580

UNITED STATES PATENT OFFICE 2,025,580

COMPASS

Henry Hugo Engelhardt, Chicago, Ill., assignor of one-fourth to Rodney G. Richardson, Chicago, Ill.; Harold J. McCreary administrator of said Henry Hugo Engelhardt, deceased Application August 6, 1930, Serial No. 473,499

14 Claims. (Cl. 33—204)

No compass has ever before been made employing the cathode ray to determine the direction of the magnetic field of the earth, so far as I know. The primary object of the present invention is to produce a system of determining the direction of the earth's magnetic field which uses a cathode ray and does not depend upon movable mechanical parts of any kind, thus avoiding the errors caused by the vibration, acceleration, and gyration of the ship, vehicle, or person bearing the compass.

In carrying out my invention, I cause a cathode ray to impinge upon suitable plates of conductive material in such manner that the energy absorbed by them from the ray is transmitted to a suitable indicating device. Any deviation caused by the magnetic field of the earth causes the cathode ray to impinge upon certain of the plates more than on the others, and the indicating device is controlled accordingly. In one of its aspects, therefore, my invention may be regarded as having for its object means for determining the deflection of a cathode ray by the magnetic field of the earth.

The various features of novelty whereby my invention is characterized will hereinafter be pointed out with particularity in the claims; but for a full understanding of my invention and its objects and advantages reference may be had to the following detailed description in connection with the accompanying drawings, wherein Fig. 1 represents a side elevation of such a device. The cathode ray, shown by the dotted lines 12, is shown as striking between and equally upon both of the plates 1 and 2. It will be seen that this will cause an equal current flow through the differentially wound coils 10 around the core 11 of the indicator, the circuit being completed through the battery "B", and the thermionic filament 6.

Fig. 2 shows an end view of the tube which is shown in Fig. 1. The dotted lines 12 represent the part of the surface normally struck by the cathode ray. Segments 3 are made of a magnetic substance having a low magnetic reluctance, such as soft iron, and serve merely to concentrate the magnetic field in the region of the cathode ray and are not absolutely necessary. It will now be seen that the character and density of any magnetic field existing between the segments 3 will depend upon their position relative to the earth's magnetic field. It will also be seen that when any magentic field exists between the segments 3 the cathode ray 12 will be deflected. This deflection of the cathode ray will cause a greater portion of said cathode ray to impinge upon plate 1 than plate 2 or vice versa depending upon the polarity of said magnetic field.

Referring again to Fig. 1, it will be seen that a deflection of the cathode ray 12 causing a greater portion of said cathode ray to strike upon plate 1 will cause a greater amount of current to flow through the coil to which said plate 1 is connected and a corresponding decrease in the current flowing through the coil to which plate 2 is connected, causing the core 11 to assume a magnetism corresponding to the N pole of the permanent magnet 9, which in turn will attract the armature 8 carrying the needle 7.

Fig. 3 is an end view of a similar device having a greater number of plates than that shown in Figs. 1 and 2. In this instance the cathode ray 9 is deflected at all times to some position on the circle 10, the radius of said circle being dependent upon the density of the magnetic lines of force and the relative angle of said lines of force to the perpendicular axis 13 of the tube. It will now be seen that the cathode ray 9 will always fall upon a line through the center of the tube normal to the magnetic lines of force; thus as the tube is rotated about its axis 13 the cathode ray 9 will describe the circle 10. The plates 1, 2, 3, 4, 5, 6, 7 and 8 are connected by suitable conductors to the coils 1', 2', 3', 4', 5', 6', 7', and 8', respectively. Conductor 12 is common to all of said coils and connects them with the battery and thermionic filament (not shown) completing the circuit. It will be further seen that when the cathode ray 9 strikes upon any segment such as 1 the greater portion of the current will flow through the coil 1' and that the armature 11 will be attracted to assume the position shown in the drawing and that the indicating needle or card will show the direction of the magnetic lines of force passing through the tube.

It may be pointed out that the indicating devices here shown and described are not essential to the proper functioning of this device but may be replaced by a device for amplifying the current variations, or by a device for producing sound, or by a device for automatically controlling or steering a vehicle, or any other device to obtain the desired effect.

For the sake of clearness and brevity I have illustrated only a few simple embodiments of my invention and the several features thereof, and have described them with particularity; but it will of course be understood that my invention is not limited to the forms thus illustrated and described, as I intend to cover all forms, methods, and arrangements that come within the definitions of my invention as set forth in the appended claims.

I claim:

1. In a navigating instrument, means for generating a cathode stream, means for producing from said stream an unaccelerated ray or beam capable of deflection by the earth's field, two targets upon which the end of said beam impinges, an indicating device, and circuits including said ray and said targets for controlling said device.

2. In a navigating instrument, means for generating a cathode ray, an electro-magnetic indicating device, and means for actuating said device responsive to deflection of said ray by the earth's magnetic field.

3. In a navigating instrument, an indicating device giving a neutral indication when a course is set and arranged to indicate "right" or "left" on deviation from the course, means for generating a cathode ray which is deflected by the earth's field upon deviation from the course, and means controlled by said ray upon deflection thereof for causing said device to indicate "right" or "left" depending upon the direction of the deflection.

4. In a navigating instrument, means for generating a cathode ray capable of being bent from a straight line by the earth's field, a target upon which the ray impinges responsive to a certain deviation from the course, a second target upon which the ray impinges responsive to an opposite deviation, a deviation indicator, and means connecting said targets and indicator for controlling said indicator.

5. In a compass, means for producing a cathode ray the extremity of which moves in a circular path due to deflection by the earth's field when the compass is oriented through 360°, an indicating device including a pointer, electromagnetic means for maintaining said pointer in a position corresponding to the position of said ray, and means whereby said ray controls said electro-magnetic means.

6. In a compass, means for generating a cathode ray, a target over which said ray traces a circular path due to deflection of the ray by the earth's field as the compass is oriented through 360 degrees, an indicating device, and means including circuits connecting said target and device for controlling said device in accordance with the position of the ray in its path.

7. In a compass, means for producing a cathode ray or beam, said means comprising a cathode, an anode located adjacent said cathode and having an opening for the passage of electrons, means for impressing a potential on said anode to accellerate electrons emitted by said cathode and produce a beam passing thru said anode and beyond, a plurality of targets on some one of which the end of said beam impinges depending on the direction relative to the compass in which it is deflected by the earth's field, an indicator, and an electrical circuit including said beam and said targets for controlling said indicator.

8. In a compass, means for generating a cathode ray, said ray including a portion readily deflected by the earth's field which describes an inverted cone relatively to the compass when the compass is oriented through 360 degrees, and means cooperating with the said ray in any deflected position to indicate the direction of a predetermined line of said compass with reference to the magnetic meridian at the point where the compass is located.

9. In a navigating instrument, means for producing a cathode ray the end of which is deflected under the influence of the earth's field, a plurality of conductors successively contacted by the deflected ray as the instrument is rotated in said field, a plurality of circuits terminating, respectively, at said conductors, an indicator, and electro-magnetic means controlled over said circuits for operating said indicator.

10. In a navigating instrument, means for producing a cathode ray, means for positioning said instrument with the ray directed upward from the earth's surface and cutting across the lines of force of the earth's field, whereby the end of the ray is caused to traverse laterally in a direction to the East, a series of circuits adapted to be selectively completed by said ray in accordance with the orientation of said instrument, a reference member, and means controlled over said circuits for aligning said member with respect to the magnetic meridian.

11. In a compass, means for generating a vertical cathode ray, said ray being deflected from the vertical by the earth's magnetic field, said compass being adapted to be oriented and having means cooperating with the ray in the various orientations of said compass to indicate the amount of orientation with reference to the magnetic meridian.

12. An instrument comprising means for generating a cathode ray, a member movable about an axis, and means controlled by said ray when the end thereof is deflected from its normal position by the earth's field for controlling the movement of said member on said axis.

13. An instrument comprising an electron emitting element, means for forming a beam of emitted electrons, a member movable about an axis, electro-magnetic means for moving said member on said axis, and means controlled responsive to deflection of said beam under the influence of the earth's field for controlling said moving means.

14. In a compass, means for producing a cathode ray, direction indicating means, electrical circuits controlled by said cathode ray responsive to deflections thereof by the earth's field, and means including said circuits for controlling said indicating means.

HENRY HUGO ENGELHARDT.